(12) United States Patent
Chen et al.

(10) Patent No.: US 7,965,442 B2
(45) Date of Patent: Jun. 21, 2011

(54) COMBINED RETARDATION OPTICAL DEVICE

(75) Inventors: Chao-Chang Chen, Taipei (TW); Jr-Rung Chen, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 401 days.

(21) Appl. No.: 12/155,684

(22) Filed: Jun. 9, 2008

(65) Prior Publication Data
US 2009/0190217 A1 Jul. 30, 2009

(30) Foreign Application Priority Data
Jan. 29, 2008 (TW) ................................ 97103191 A

(51) Int. Cl.
*G02B 5/30* (2006.01)

(52) U.S. Cl. ............................ 359/489.07; 359/489.15

(58) Field of Classification Search ............... 359/371, 359/386, 489
See application file for complete search history.

(56) References Cited

U.S. PATENT DOCUMENTS
7,061,613 B1 * 6/2006 Huang et al. ............... 356/364
7,760,431 B2 * 7/2010 Williams et al. ............ 359/489
* cited by examiner

*Primary Examiner* — Arnel C Lavarias
(74) *Attorney, Agent, or Firm* — Rosenberg, Klein & Lee

(57) ABSTRACT

A combined retardation optical device includes a first retardation optical plate and a second retardation optical plate. The second retardation optical plate contains a flat portion and a multi-step portion. This multi-step portion has several step-like flat surfaces with predetermined heights. The flat portion contacts with the first retardation optical plate. Both the first retardation optical device and the second retardation optical plate are made from birefringent materials. This invention is easy to switch to a different retardation condition for observation. Plus, there is no need to adjust or replace any element.

6 Claims, 4 Drawing Sheets

COMBINED RETARDATION OPTICAL DEVICE

FIELD OF THE INVENTION

The present invention relates to a combined retardation optical device, and more particularly to a combined retardation optical device having a multi-step portion. So, it can be easily moved to alter its retardation amount for a better observation. There is no need to replace or adjust any element during the operation.

BACKGROUND OF THE INVENTION

With regard to the stress measurement, the strain gauge is the commonly used device. However, the stress gauge only can measure a single point of a testing object. If the size of such testing object is too large, the installing time is lengthy. If this testing object is too small, it is hard to install it. This stress measurement cannot detect the distribution condition of internal thermal stress or flowing stress inside the testing object. Thus, the traditional measuring method is not convenient. But, if someone uses the photoelasticity measuring method, the above disadvantages can be solved.

The principle of the photoelasticity is based on the property of birefringence. When a light passes through a polarized plate, the vibration direction is limited to certain direction. Then, this polarized light passes through a birefringent material (that has the property of double refraction or birefringence) generating two lights with different velocities. Hence, its stress distribution (many lines) can be seen so that the user can determine the entire stress distribution of this testing object. These lines include isochromatics and isoclinies. The isochromatics are colored lines caused by the difference stress. Usually, it is determined by so-called "fringe order." The isoclinics are to be observed to find out the developing direction of the principle stress.

The traditional retardation optical device 90 (as shown in FIG. 1) is used to observe the photoelastic lines and then the entire stress distribution can be seen. When the light X is white, the generating lines (such as the corresponding isochromatics) will be colored. If the light X is a monochrome, the generating lines (such as the corresponding isochromatics) will become black and white. When the isochromatics are colored, the user can observe the "fringe order" from the isochromatics, according to a stress-and-isochromatics converting table. When the isochromatics are black and white, the user can observe the distribution density of these lines (which is the isochromatics). If the distribution density is high, it means the stress concentration occurs.

However, no matter colored lines or black-and-white lines, there is a blurred zone, such as the blurred gradient zone between the purple line and blue line or the gray zone between the black line and white line. As illustrated in FIG. 2, the traditional retardation optical device 90 utilizes a micrometer to adjust the total thickness of the compensating plate (including two plates with a tilted sliding interface). The combined structure of the micrometer and the compensating plate is labeled by 91. By adjusting the thickness of the compensating plate, the retardation amount can be altered, so that the color of the lines in the blurred zone can be changed. It is easier to observe. However, the user has to change the thickness of the compensating plate (controlled by the micrometer) for different requirements. When the user observe a testing object 92, this one might need to change the thickness of the compensating plate many times for obtaining different retardation amounts. For example, if the user needs to change five different retardation amounts, this person has to change the thickness of the compensating plate five times (either by adjusting the micrometer or by replacing thicker or thinner plates instead). Therefore, the practical operation of the traditional device is time-consuming and inconvenient.

SUMMARY OF THE INVENTION

The primary object of the present invention is to provide a combined retardation optical device in which it is easy to switch to different retardation conditions for observation.

The next object of the present invention is to provide a combined retardation optical device. There is no need to adjust or replace any element.

In order to achieve above-mentioned objects, the present invention is provided. A combined retardation optical device comprising:

a first retardation optical plate; and a second retardation optical plate including a flat portion and a multi-step portion, the multi-step portion having a plurality of step-like flat surfaces with predetermined heights; the flat portion contacting the first retardation optical plate; both the first retardation optical device and the second retardation optical plate being made by birefringent materials.

DETAILED DESCRIPTION OF THE PREFERRED EMBODIMENT

Figure 1:
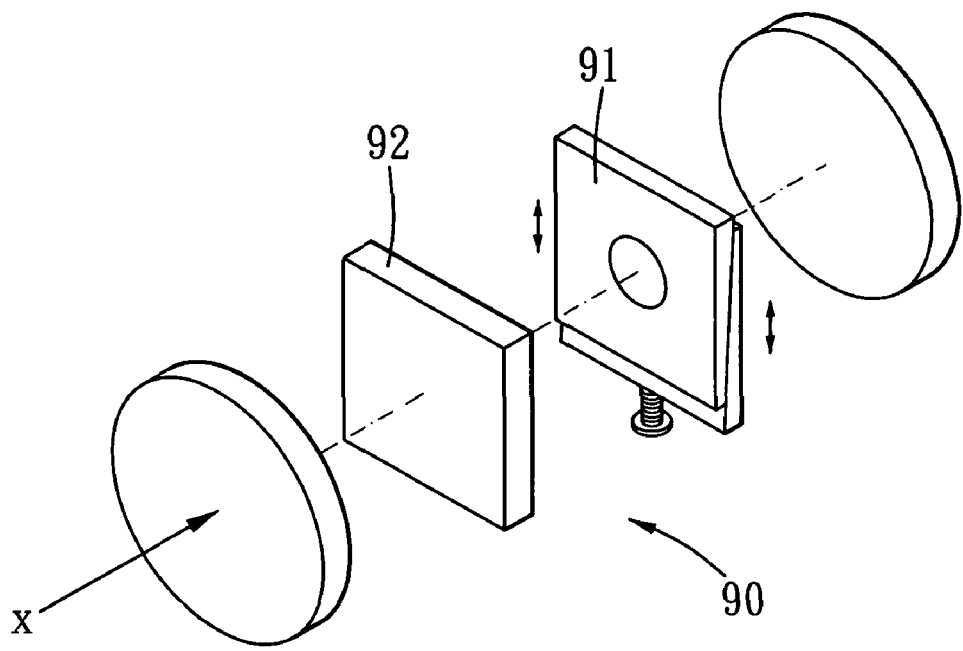
FIG. 1 is a perspective view of the traditional retardation device.
Figure 2:
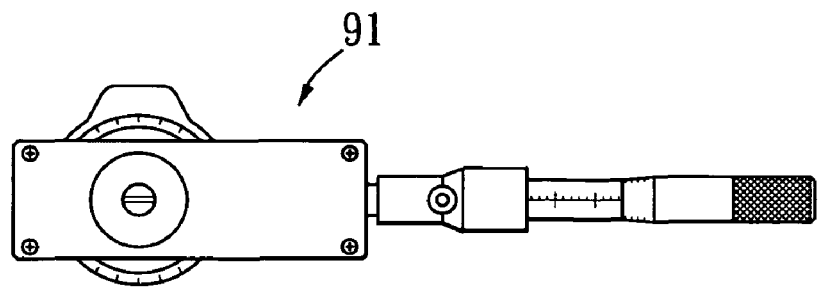
FIG. 2 shows the micrometer portion of the traditional retardation device.
Figure 3:
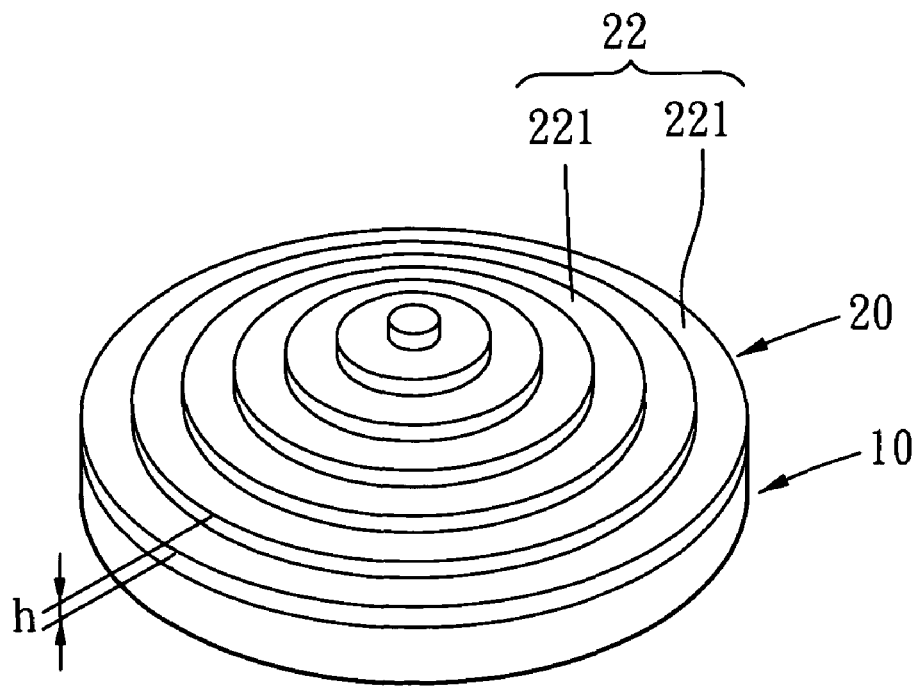
FIG. 3 is the first preferred embodiment of the combined retardation optical device of this invention.
Figure 4:
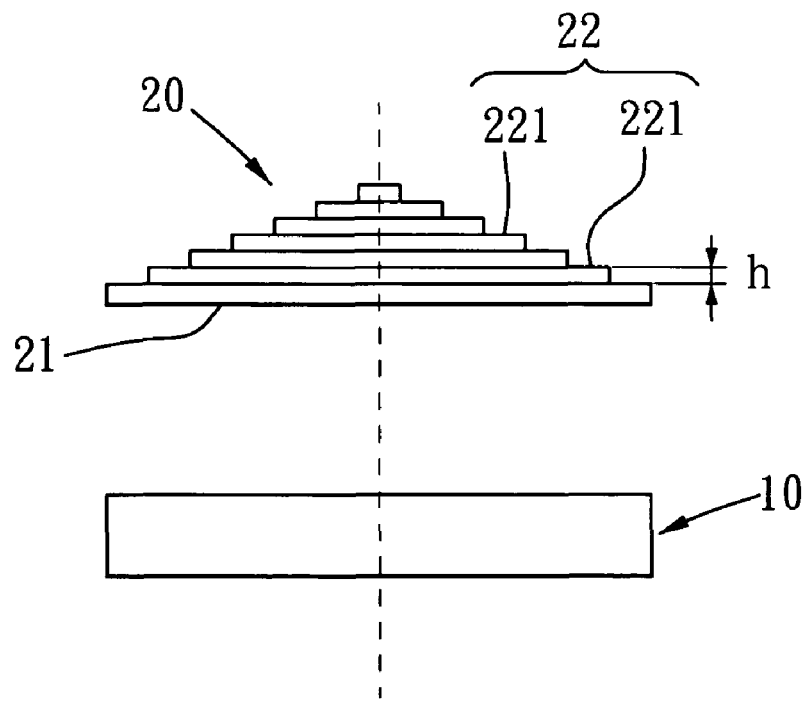
FIG. 4 is a view showing the disassembled condition of the combined retardation optical device of this invention.

Referring to FIGS. 3 and 4, the present invention is a combined retardation optical device. It mainly comprises a first retardation optical plate 10 and a second retardation optical plate 20.

Concerning the second retardation optical plate 20, it includes a flat portion 21 and a multi-step portion 22. The multi-step portion 22 has a plurality of step-like flat surfaces 221 with predetermined heights h. The flat portion 21 is in contact with the first retardation optical plate 10. Both the first retardation optical device 10 and the second retardation optical plate 20 are made by birefringent material (having the characteristics of birefringence or double refraction).

More particularly, both said first retardation optical plate 10 and second retardation optical plate 20 are co-axial circular plates.

Based on the required optical retardation, the step-like flat surfaces 221 of the multi-step portion 22 can be modified to have suitable and different heights h. In which, the second retardation optical plate 20 is a centrally protruded structure (as shown in FIGS. 3 and 4). The heights of said step-like flat surfaces of said multi-step portion increase toward a central point of said second retardation optical plate.

Figure 5:
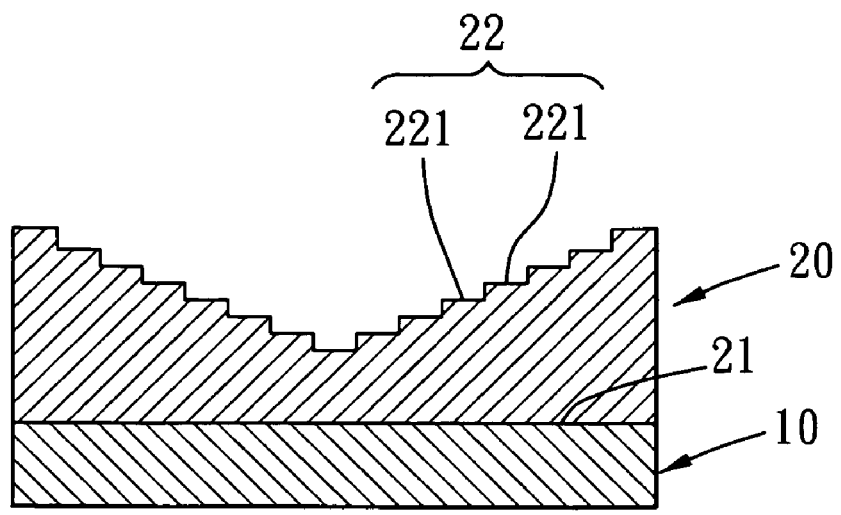
FIG. 5 is the second preferred embodiment of the combined retardation optical device of this invention.

As illustrated in FIG. 5, in the second preferred embodiment of the present invention, the second retardation optical plate 20 is a centrally recessed structure. The heights of the step-like flat surfaces 221 of the multi-step portion 22 decrease toward a central point of the second retardation optical plate 20.

Figure 6:
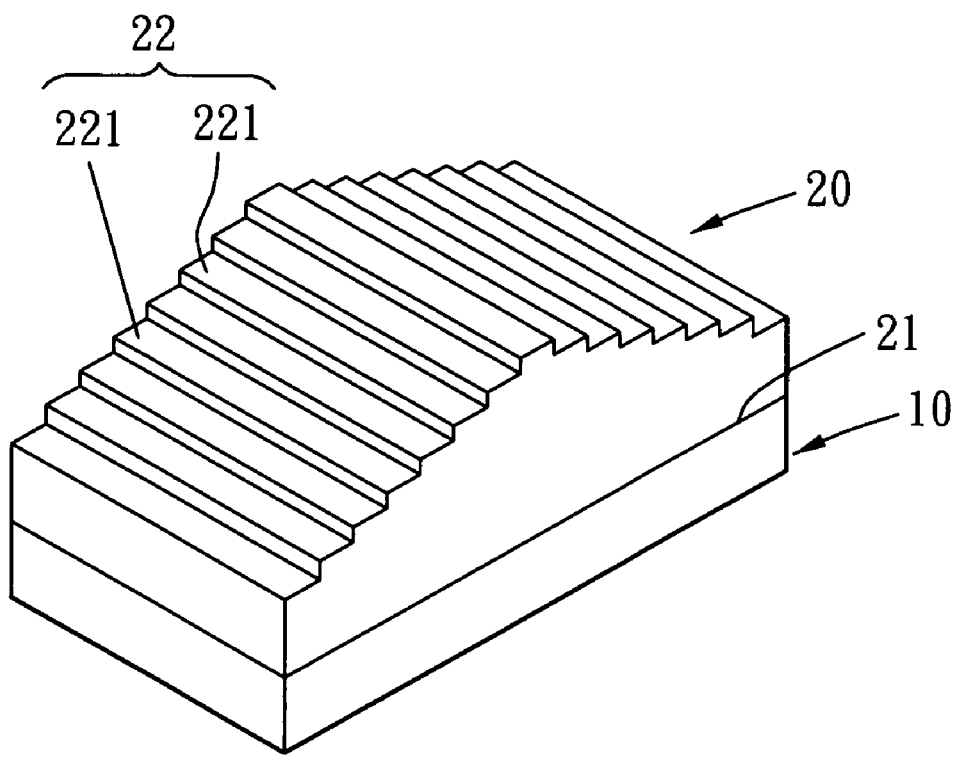
FIG. 6 is a third preferred embodiment of the combined retardation optical device of this invention.

As shown in FIG. 6, in the third preferred embodiment of the present invention, both the first retardation optical plate 10 and second retardation optical plate 20 are modified as two thin rectangular plates.

Figure 7:
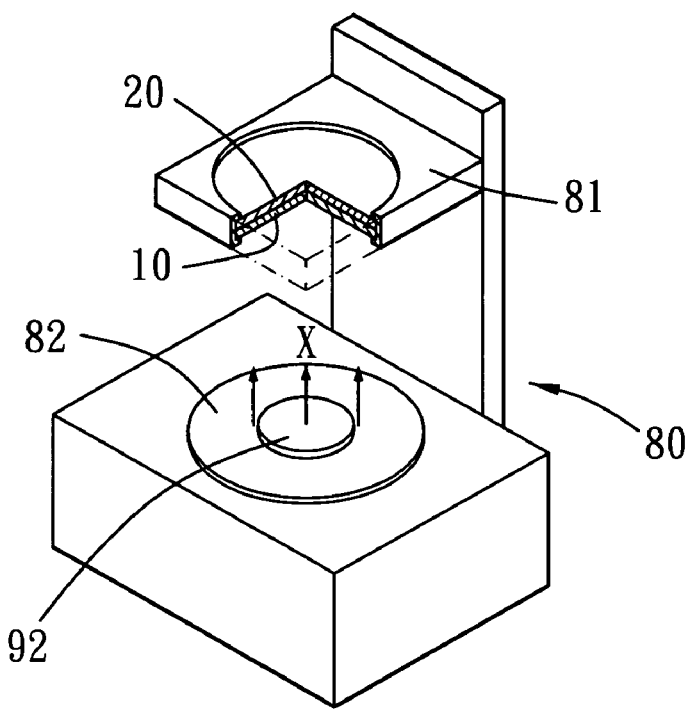
FIG. 7 is a perspective view illustrating a practical application of the present invention.

FIG. 7 depicts a practical application of the present invention. The first retardation optical plate 10 and second retardation optical plate 20 are installed on an analyzer 81 of a photoelastic measuring equipment 80. A polarizer 82 emits light X upward from a lower position. A testing object 92 can be placed on the polarizer 82 so the light X passes through the polarizer 82, the testing object 92, the first retardation optical plate 10 and second retardation optical plate 20. Finally, the user can observe the strength distribution of the testing object 92.

In addition, if the light X is white, the generating lines (such as the corresponding isochromatics) will be colored. If the light X is a monochrome, the generating lines (such as the corresponding isochromatics) will become black and white and its image will become gray-scaled. When the isochromatics are colored, the user can observe the "fringe order" from the isochromatics, according to a stress-and-isochromatics converting table. When the isochromatics are black and white, the user can observe the distribution density of these lines (which is the isochromatics). If the distribution density is high, it means the stress concentration occurs.

Practically, the heights h of the step-like flat surfaces 221 of the multi-step portion 22 of the second retardation optical plate 20 can be modified to meet different requirements before the present invention is manufactured. For example, the height h of the first step-like flat surfaces 221 is one unit. The height h of second step-like flat surfaces 221 is two units, and so on. Of course, it can be designed as increasing or decreasing. Thus, the present invention has several different heights h. Under such circumstances, when a light X passes through all these step-like flat surfaces 221, different retardation amounts will occur. Based on the following equation, the user can calculate a retardation amount of a specific step.

$$\delta = (n_e - n_o)h = (n_e - n_o)(d_2 - d_1)$$

Assuming i means a specific step, the retardation amount of the i th step can be calculated as follows.

$$\delta_i = (n_e - n_o)[(d_2 + \Delta d_3 \cdot i) - d_1]$$

Thus, the required thickness ($\Delta d_3$) for different retardation can be designed. Hence, the user can select a product with suitable step-like flat surfaces 221 having proper heights. About the above equations, $\delta$ means the retardation amount;

$(n_e - n_o)$ means the birefringence coefficients difference of these two birefringent materials.

$(d_2 - d_1)$ means the height difference; and i means the number of a specific step.

Figure 8:
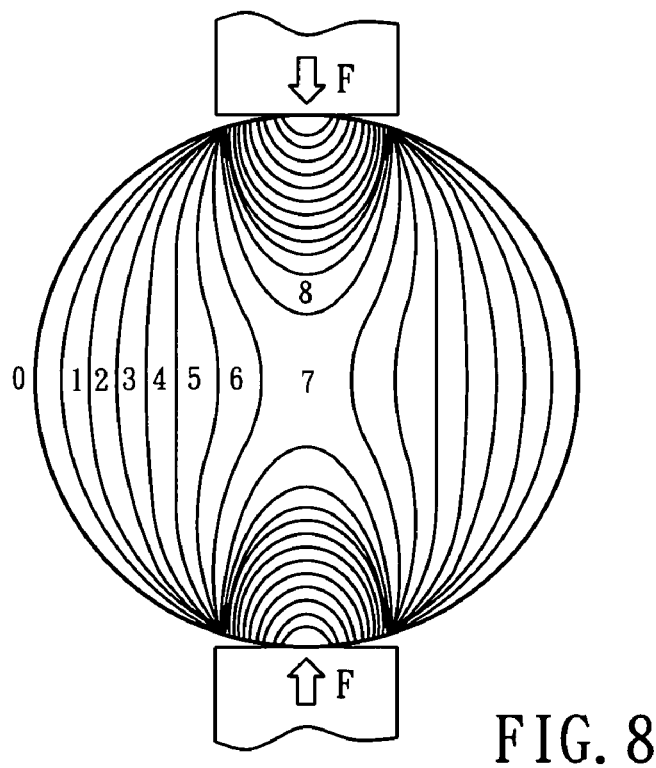
FIG. 8 shows an example where the user can observe the lines illustrating the stress distribution of a testing object.

Referring to FIG. 8, when an external force or forces (labeled by F) applies at a specific position of the testing object 92, the stress distribution occurs. Theoretically, the corresponding stress can be known by the following equation.

$$f_\sigma = \frac{8}{\pi D} \frac{P}{N}$$

Assuming the diameter (D) is 63.5 mm, the applying force (P) is 1.33 KN, the number of lines (N) (such as the central position's number of lines is approximately 7).

Just put the given data into the equation.

$$f_\sigma = \frac{8}{\pi D} \frac{P}{N}$$

So, the user can obtain the result.

$$f_\sigma = \frac{8}{\pi 2.500} \frac{298}{7} = 43 \frac{\text{psi} \cdot \text{in}}{\text{fringe}}$$

Moreover, when the colored or black-and-white lines in the zone to be observed is blurred, the user can move this invention so as to allow the multi-step portion 22 (having different heights) moving to a suitable place that the color gradient of the lines (colored or gray-scaled) varying. For example, at first the color gradient that is between green and blue (since their color difference is relative small, it is hard to distinguish between them), then the user adjust to another color gradient that is between yellow and green (since their color difference is relative large, it is easier to distinguish between them). Hence, once the color difference is larger, it is easy to be observed by the user. The user can select a proper product with suitable step-like flat surfaces 221 with proper heights h (to have different retardation amounts), so that the user can observe the color difference more precise. Also, the corresponding stress values can be obtained with higher accuracy.

Therefore, the advantages and functions of the present invention can be summarized as follows.

[1] It is easy to switch to different retardation condition for observation. In the operation of the traditional device, the thickness of the compensating plate has to be adjusted (by micrometer) or be replaced. In addition, the required thickness should match with the wavelength of the light used in the traditional device. The operation is complicated and time-consuming. However, in the present invention, the unique multi-step portion design provides many different heights (or thicknesses) for having different retardation amounts. The user can easily move and switch to a different retardation condition for better observation. Hence, the best observation for colored lines in a blurred zone can be achieved.

[2] There is no need to adjust or replace any element. In the operation of the traditional device, the thickness of the compensating plate has to be adjusted (by micrometer) or be replaced. It requires many compensating plates for different ranges of retardation amount. However, based on the unique multi-step portion design of the present invention, there is no need to adjust or replace any element. It is extremely convenient in operation.

The above embodiments are only used to illustrate the present invention, and are not intended to limit the scope thereof. Many modifications of the above embodiments can be made without departing from the spirit of the present invention.

What is claimed is:

1. A combined retardation optical device comprising:
a first retardation optical plate; and a second retardation optical plate including a flat portion and a multi-step portion, said multi-step portion having a plurality of step-like flat surfaces with predetermined heights;

wherein said flat portion is in contact with said first retardation optical plate, wherein both said first retardation optical device and said second retardation optical plate are made from birefringent materials, and wherein said second retardation optical plate is a centrally protruded structure, the heights of said step-like flat surfaces of said multi-step portion increasing toward a central point of said second retardation optical plate.

2. The combined retardation optical device as defined in claim 1, wherein said first retardation optical plate and second retardation optical plate have the same central axis, both said first retardation optical plate and second retardation optical plate being thin circular plates.

3. The combined retardation optical device as defined in claim 1, wherein both said first retardation optical plate and second retardation optical plate are thin rectangular plates.

4. A combined retardation optical device, comprising:
a first retardation optical plate; and
a second retardation optical plate including a flat portion and a multi-step portion, said multi-step portion having a plurality of step-like flat surfaces with predetermined heights, wherein said flat portion is in contact with said first retardation optical plate;

wherein both said first retardation optical device and said second retardation optical plate are made from birefringent materials, and wherein said second retardation optical plate is a centrally recessed structure, the heights of said step-like flat surfaces of said multi-step portion decreasing toward a central point of said second retardation optical plate.

5. The combined retardation optical device as defined in claim 4, wherein said first retardation optical plate and second retardation optical plate have the same central axis, both said first retardation optical plate and second retardation optical plate being thin circular plates.

6. The combined retardation optical device as defined in claim 4 wherein both said first and second retardation optical plates are thin rectangular plates.

* * * * *